United States Patent [19]
Bristow

[11] 4,091,234
[45] May 23, 1978

[54] JOYSTICK WITH ATTACHED CIRCUIT ELEMENTS

[75] Inventor: Stephen D. Bristow, Santa Clara, Calif.

[73] Assignee: Atari, Inc., Sunnyvale, Calif.

[21] Appl. No.: 782,976

[22] Filed: Mar. 30, 1977

[51] Int. Cl.² ............................................. G08C 21/00
[52] U.S. Cl. ...................................... 178/18; 338/114
[58] Field of Search ................. 178/18, 19, 20; 338/2, 338/6, 114; 336/137

[56] References Cited

U.S. PATENT DOCUMENTS

| | | | |
|---|---|---|---|
| 2,446,392 | 8/1948 | Rey | 178/19 |
| 2,965,715 | 12/1960 | Adler | 178/19 |
| 3,011,063 | 11/1961 | Deutschle | 338/114 X |
| 3,864,515 | 2/1975 | Fee, Jr. | 178/18 |

Primary Examiner—Thomas A. Robinson
Attorney, Agent, or Firm—Flehr, Hohbach, Test, Albritton & Herbert

[57] ABSTRACT

An improved joystick having an operating shaft mounted on a base with a ball and socket joint and a plurality of circuit elements directly actuated by the operating shaft. The circuit elements vary in impedance in correspondence to the displacement of the operating shaft so that the displacement of the operating shaft is converted into corresponding electrical signal.

6 Claims, 11 Drawing Figures

U.S. Patent  May 23, 1978  Sheet 1 of 2  4,091,234
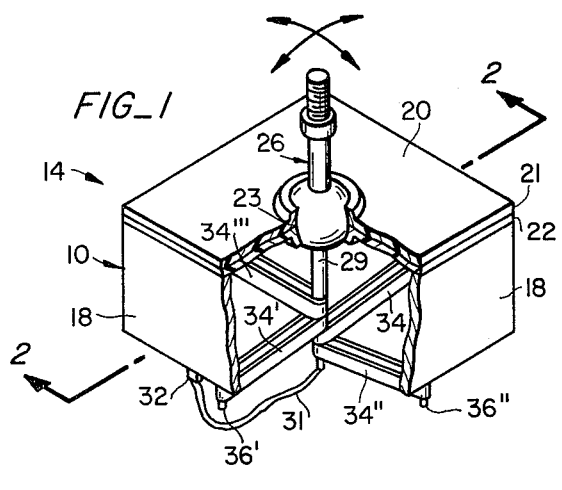
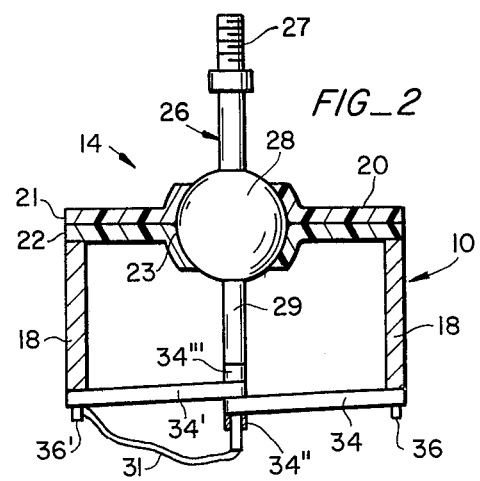
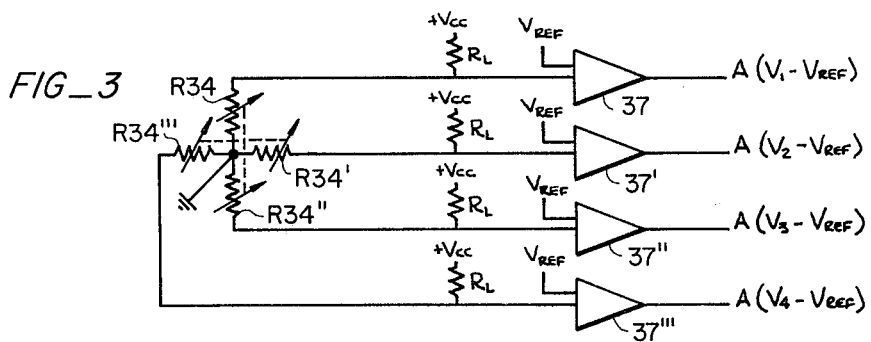
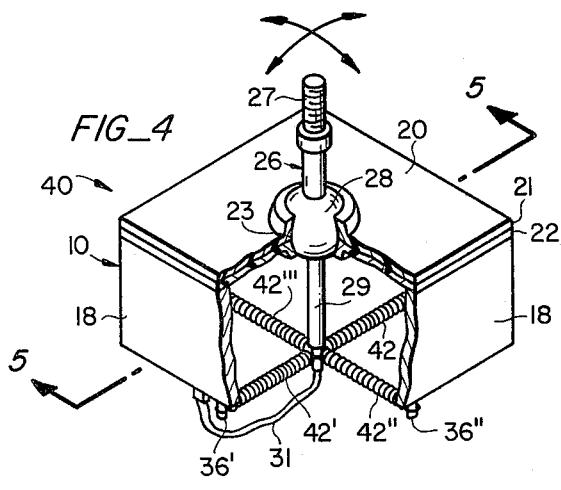
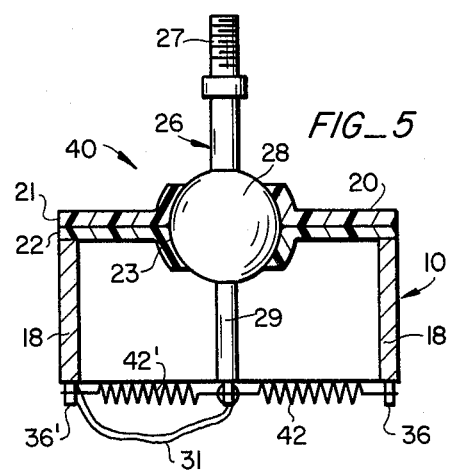
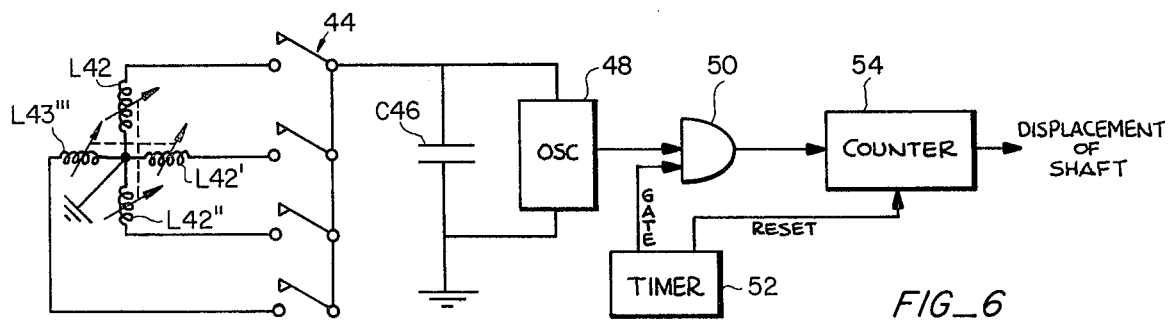

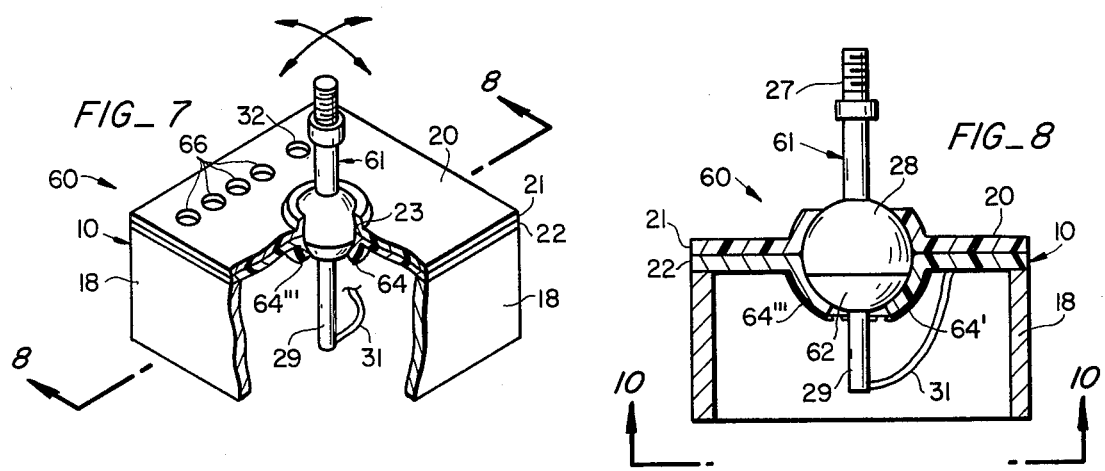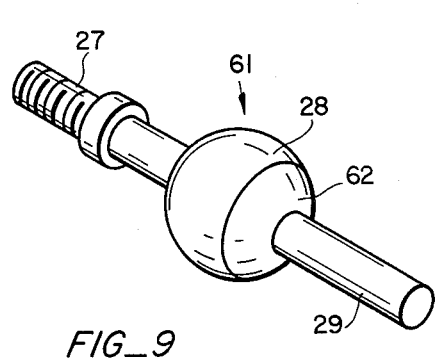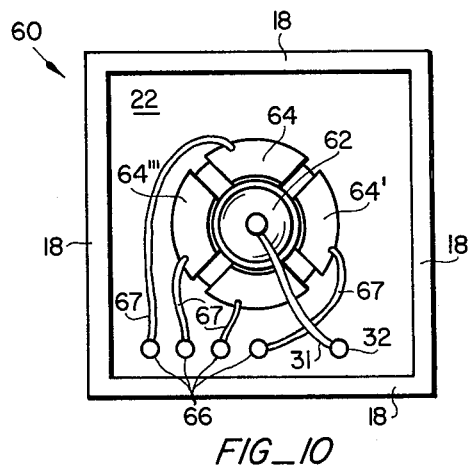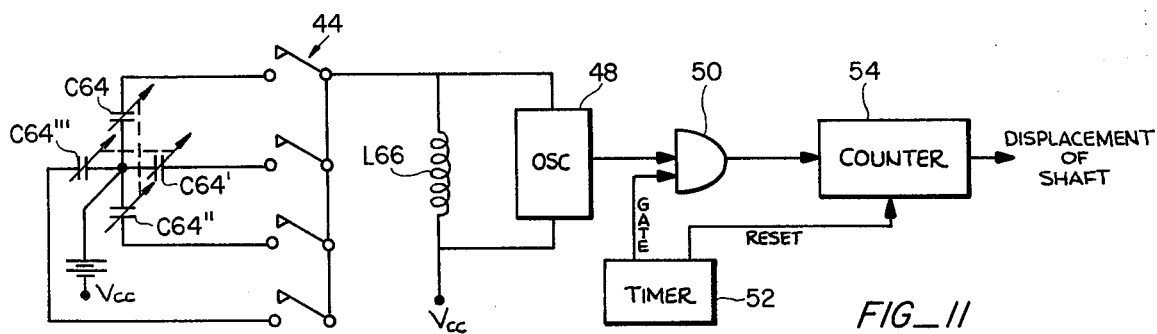

JOYSTICK WITH ATTACHED CIRCUIT ELEMENTS

BACKGROUND OF THE INVENTION

1. Field of the Invention

The present invention generally relates to tracking control systems and, in particular, to joysticks.

2. Description of the Prior Art

A tracking control system is an apparatus for converting the manual input commands from an operator into analog output signals that can be used to control the position of machines and the motion of the images in visual displays. For many years joysticks have been used to perform these functions. The typical joystick has a control handle mounted on a base with a ball and socket joint and a linkage actuated by the control handle that is connected to a potentiometer. The control handle can be manipulated in a solid angle by the operator. Output signals are obtained from the potentiometer according to the direction and the amount of inclination of the control handle.

Heretofore, joysticks have tended to be expensive because potentiometers, microswitches and complex linkages have been required in order to translate the operator's manual input commands into electrical signals. For example, in a conventional joystick at least four microswitches or two potentiometers are required along with the corresponding mountings and electrical terminals. In addition, these prior joysticks are complicated to manufacture and the numerous operations required in the assembly process have resulted in high unit cost.

SUMMARY OF THE INVENTION

The primary object of the present invention is to overcome the limitations and disadvantages of the prior art.

An additional object of the present invention is to eliminate the need for microswitches and potentiometers in joysticks and to provide a simple, low-cost tracking control system.

These and other objects are achieved by an improved joystick having an operating shaft mounted on a base with a ball and socket joint. Directly connected to the operating shaft are a plurality of circuit elements that vary in impedance in correspondence to the displacement of the operating shaft. The displacement of the shaft is thereby converted into corresponding electrical signals.

Additional objects and features of the invention will appear in the following description in which the preferred embodiments have been set forth in detail in conjunction with the accompanying drawings.

BRIEF DESCRIPTION OF THE DRAWINGS

FIG. 1 is an isometric view, partially cut away, of one embodiment of the joystick according to the present invention.

FIG. 2 is a side elevational view, in section, taken along line 2—2 of the joystick of FIG. 1.

FIG. 3 is a schematic diagram of the electrical circuit used in conjunction with the joystick of FIG. 1 for converting the displacement of the operating shaft into corresponding electrical signals.

FIG. 4 is an isometric view, partially cut away, of an alternative embodiment of the joystick according to the present invention.

FIG. 5 is a side elevational view, in section, taken along line 5—5 of the joystick of FIG. 4.

FIG. 6 is a schematic diagram of the electrical circuit used in conjunction with the joystick of FIG. 4 for converting the displacement of the operating shaft into corresponding electrical signals.

FIG. 7 is an isometric view, partially cut away, of a second alternative embodiment of the joystick according to the present invention.

FIG. 8 is a side elevational view, in section, taken along line 8—8 of the joystick of FIG. 7.

FIG. 9 is an isometric view of the operating shaft of the joystick of FIG. 7.

FIG. 10 is a bottom plan view of the joystick of FIG. 7.

FIG. 11 is a schematic diagram of the electrical circuit used in conjunction with the joystick of FIG. 7 for converting the displacement of the operating shaft into corresponding electrical signals.

DESCRIPTION OF THE PREFERRED EMBODIMENTS

FIGS. 1, 2, and 3 illustrate an embodiment 14 of the present invention wherein the operator's manual input causes a corresponding variation in resistance. This embodiment includes a base 10 having four side walls 18 and a top wall 20. The top wall includes an upper plate 21 and a lower plate 22 that are joined together to form the socket portion 23 of a conventional ball and socket joint. The top wall can be fabricated from any suitably rigid, formable material such as thermo-plastic. The side walls are made of an electrically conductive material such as steel and form part of the ground for the electrical circuit described below.

The joystick 14, FIG. 1, further includes an operating shaft 26 that is received in the socket 23 of the base 10. The operating shaft includes a threaded end portion 27, a central ball 28 and an actuating arm 29. The ball 28 is received within the socket so that a ball and a socket joint of conventional construction is formed. The threaded end portion 27 is adapted to receive a threaded control handle (not shown) that is actuated by the operator. If it is desired to operate the joystick directly the threaded portion 27 may be omitted. The ball and socket joint permits the operating shaft to be manipulated about a solid angle by the operator. The motion of the threaded end portion 27 is translated by the ball into a corresponding reciprocal displacement of the actuating arm 29. The operating shaft is fabricated from an electrically conductive material such as steel.

Connected between the side walls 18, FIG. 1, of the base 10 and the actuating arm 20 of the operating shaft are a plurality of circuit elements that vary in impedance with the displacement of the operating shaft. In the embodiment of FIGS. 1 and 2, these circuit elements are four resilient, elastomeric members 34–34''' fabricated from conductive rubber. This rubber is of the type commonly used for the keyboards on hand-held electronic calculators and has a very high carbon content. The members are made into rubber bands that become more electrically conducting under tension.

The four rubber bands 34–34''', FIG. 2, are connected between the actuating arm 29 of the operating shaft and four terminals 36 each located on one of the four side walls 18 of the base. The terminals are electrically insulated from the base. The base, which forms the ground in the electrical circuit described below, is electrically connected via a fine braided wire 31 to the operating shaft 26 from post 32.

It should be appreciated that the conductive rubber bands 34 provide a self-centering action to the operating shaft 26. When the operator releases the operating shaft, it returns to the center upright position. It should further be noted that the four rubber bands are mounted along two mutually perpendicular axes so that any displacement of the operating shaft causes at least one of the members to be compressed and at least one of the members to be stretched under tension.

FIG. 3 is a schematic diagram of an electrical circuit for converting the displacement of the operating shaft 26, FIG. 1, into corresponding electrical signals. The four rubber bands 34-34''' of FIG. 1 are illustrated in FIG. 3 as the variable resistances $R_{34}$-$R_{34'''}$. The variable resistances are connected by phantom lines to indicate that tension in one of the bands is always accompanied by a compression in a complementary rubber band. The four variable resistances are connected together and grounded through the wire 31 to the base 10, FIG. 1.

Each variable resistance $R_{34}$-$R_{34'''}$, FIG. 3, is connected to a fixed resistor $R_L$ in order to form four voltage divider circuits. The output of each voltage divider is subtracted from a reference voltage $V_{REF}$ and the difference is amplified by an amplifier 37. The four output signals $A(V_1-V_{REF})$ through $A(V_4-V_{REF})$ from these amplifiers are voltages which are proportional to the direction and the magnitude of the displacement of the operating shaft.

The four voltage divider circuits depicted in FIG. 3 can be operated with either AC or DC current. If DC current is used, the joystick of FIG. 1 and the circuit of FIG. 3 will not radiate any RF signals and, thus, can easily comply with the standards of the United States Federal Communications Commission concerning the incidental radiation of RF energy.

The joystick 40 illustrated in FIGS. 4 and 5 is an alternative embodiment of the present invention wherein the operator's manual input causes a corresponding variation in inductance. The construction and operation of the base 10, ball and socket, and operating shaft 26 are the same as the previously described joystick 14, FIG. 1. In all the figures, like numbers identify identical parts.

In FIGS. 4 and 5 the impedance varying circuit elements are four helically coiled springs 42. The springs are fabricated from spring steel and vary in self-impedance as the actuating arm 29 of the operating shaft is displaced. By way of example, if the actuating arm 29 is moved away from the terminal 36, FIG. 5, and the tension on spring 42 is increased, the spacing between each turn of the spring increases and the self-inductance of the entire spring decreases. It should also be noted that the four springs are located along two mutually perpendicular axes so that any motion of the operating shaft causes a compression in at least one spring and a tension in a corresponding spring.

The variation in inductance for the joystick 40, FIG. 4, is measured by the electrical circuit illustrated in FIG. 6. The springs 42-42''' are depicted as the variable inductors L42-L42'''. The inductors are joined by phantom lines in order to indicate that a compression of one of the springs results in a tension in a corresponding spring. Each of the inductors is connected to a tuned LC oscillator using a semi-conductor analog switch 44. This analog switch sequentially scans each of the variable inductors and is used to avoid duplication of the frequency counting circuit described below.

Each variable inductor L42 is sequentially connected in parallel to a fixed capacitor C46 and a continuous running oscillator 48. The oscillator is of known construction and can be, for example, either a Hartley or Collpits oscillator. The output of the oscillator 48 is a variable frequency signal that corresponds to the variation in inductance of the variable inductor selected by the semi-conductor switch 44. The frequency of the oscillator 48 can be adjusted so that minute variations in the self-inductance of the springs can cause large, measurable changes in frequency.

The output frequency of the oscillator 48, FIG. 6, is measured by an AND gate 50, a timer 52, and a counter 54. A gating output signal from the timer 52 enables the AND gate 50 so that the output of the oscillator 48 is passed to the counter 54. The counter is of known construction and measures the number of zero crossings or transitions of the output signal from the oscillator. The timer 52 also resets the counter at the end of the counting period and after the state of the counter has been measured. Since the output of the oscillator is a variable frequency signal that corresponds to the variation in inductance of the selected spring 42, the output of the counter is a binary number representing the displacement of the operating shaft 26.

A second alternative embodiment of the joystick is illustrated in FIGS. 7-10. This joystick 60 uses circuit elements that vary in capacitance as the operating shaft 61 is displaced. The operating shaft for this embodiment includes a threaded end portion 27, a central ball 28 and an actuating arm 29. Located on the ball is a dome-shaped conductor 62, FIG. 9, adjacent to the actuating arm 29. The operating shaft 61 is fabricated from an electrically insulating material and the dome-shaped conductor is grounded to the base 10 by the strand of wire 31 via post 32. In the preferred embodiment the operating shaft is made of a thermo-plastic material and the dome-shaped conductor is a metalized area of chrome that is plated on to the plastic.

The top wall 20, FIG. 8, of the base is fabricated from a thermo-plastic which serves as the dielectric material for the four capacitors described below. The top wall includes both the upper plate 21 and the lower plate 22. The exterior surface of the lower plate 22 around the outside spherical wall of the socket 23 is plated with four frustro-spherical shaped areas 64-64''' of chrome. These areas are spaced apart and each is electrically connected to a terminal 66 by a wire 67. When the ball 28, FIG. 9, is received in the socket, the dome-shaped conductor 62 and the four frustro-spherical areas 64-64''' form four variable capacitors. The spherical wall of the lower plate 22 around the socket is the dielectric. The size of the dome-shaped conductor 62 is such that any displacement of the operating shaft 61 causes a variation in the coupling between the dome-shaped conductor 62 and each of the four frustro-spherical areas 64.

The variation in coupling between the four variable capacitors is measured using the electrical circuit illustrated in FIG. 11. This circuit is a tuned LC oscillator circuit analogous to the circuit of FIG. 6, except the variable capacitors C64-C64''' have been substituted for the variable inductors L42-L42''' and the fixed inductance L66 substituted for the fixed capacitance C46. In addition, the ground in FIG. 6 has been replaced by a bias voltage VCC. The operation of the circuit of FIG.

11 is analogous to the circuit of FIG. 6 described above. It should be noted that VCC in FIG. 11 could be replaced by a ground as in FIG. 6.

The output of the oscillator 48 is an electrical signal having a frequency which varies in a manner corresponding to the variation in capacitance of the variable capacitor C64 selected by the semi-conductor switch 44. The variation in frequency is counted by a zero crossing network of the type described above. The output of the counter 54 is a binary signal representing the displacement of the operating shaft 61, FIG. 9.

In operation, the joysticks 14, 40, and 60 each convert the displacement of their respective operating shafts into corresponding electrical signals. When the actuating arm 29 of each shaft is displaced, there is a corresponding variation in the impedance of at least two of the circuit elements. In the embodiment of FIG. 1, the circuit elements are the conductive rubber bands 34 that either increase or decrease in resistance as the operating shaft is moved. In the embodiment of FIG. 4, the circuit elements include four helical springs 42 and the displacement of the operating shaft causes a corresponding variation in the self-inductance of at least two of the springs. In the embodiment of FIG. 7, the displacement of the operating shaft 61 causes a corresponding variation in capacitance among four capacitors. The plates for the capacitors are the dome-shaped conductor 62 and the four frustro-spherical areas 64–64'''.

The variation in resistance of the four rubber bands 34 of FIG. 1 is measured by four voltage dividing circuits, FIG. 3. The outputs of these circuits are electrical signals proportional to the amount and direction of displacement of the operating shaft. The variation in inductance of the embodiment of FIG. 4 is measured by a tuned LC circuit that sequentially connects the variable inductors L24–L24''' in parallel across a fixed capacitor C46. The variation in capacitance of the embodiment of FIG. 7 is measured by a tuned LC oscillator circuit and a semi-conductor switch 44 that sequentially connects the variable capacitances C64–C64''' across a fixed inductor L66. The output of both LC circuits is a binary number indicating the displacement of the operating shaft. This binary number is the number of zero crossings of the output signal of the oscillator 48 measured in a predetermined period of time.

It is contemplated within the scope of the present invention to use other types of resilient conductors besides the rubber bands 34 described in connection with FIGS. 1 and 2. For example, conductive elastomeric sheets having various dimensions and cross-sections can be used in order to produce non-linear output signals from the motion of the operating shaft. Further, the shapes of the capacitor plates used in the joystick 60, FIG. 7, can be varied in order to change the amount of capacitance variation from the motion of the operating shaft 61. It is also contemplated to vary both the number and position of the circuit elements actuated by the operating shaft.

Thus, although the best modes contemplated for carrying out the present invention have been herein shown and described, it will be apparent that modification and variation may be made without departing from what is regarded as the subject matter of the invention.

What is claimed is:

1. An improved joystick of the type having an operating shaft mounted on a base with a ball and socket joint and means for converting the displacement of the operating shaft into corresponding electrical signals, wherein the improvement comprises:
   (a) an arm attached to the ball in the ball and socket joint and operatively connected to the operating shaft;
   (b) a plurality of independent, electrically conductive rubber loops connected between the arm and the base so that displacement of the operating shaft causes deformation of at least one of the loops, the loops being each adapted for varying in electrical conductivity in correspondence to said deformation; and
   (c) an electrical circuit connected to each of said loops for measuring the individual variation in resistance of each of the loops, each of said loops being electrically independent of the other loops, whereby the displacement of the operating shaft is converted into corresponding electrical signals.

2. The apparatus of claim 1 wherein four rubber loops are mounted along two mutually perpendicular axes so that any displacement of the operating shaft causes at least one loop to be compressed and at least one loop to be extended.

3. An improved joystick of the type having an operating shaft mounted on a base with a ball and socket joint and means for converting the displacement of the operating shaft into corresponding electrical signals, wherein the improvement comprises:
   (a) an arm attached to the ball in the ball and socket joint and operatively connected to the operating shaft;
   (b) a plurality of resiliently deformable, electrically conductive, elongate springs connected between the arm and the base so that displacement of the operating shaft by an exterior force causes a corresponding variation in the length of and in the inductance of at least one of the springs, said springs also being adapted for centering the operating shaft with respect to the base in the absence of exterior forces; and
   (c) an electrical circuit connected to said springs for measuring the variation in inductance of the springs whereby the displacement of the operating shaft is converted into corresponding electrical signals.

4. The apparatus of claim 3 wherein said springs are four helical springs mounted along two mutually perpendicular axes so that any displacement of the operating shaft causes at least one spring to be compressed and at least one spring to be tensioned.

5. An improved joystick of the type having an operating shaft mounted on a base with a ball and socket joint and means for converting the displacement of the operating shaft into corresponding electrical signals, wherein the improvement comprises:
   (a) a plurality of frusto-spherical capacitor plates incorporated into the socket of the ball and socket joint in the base; and
   (b) a dome-shaped capacitor plate incorporated into the ball portion of the operating shaft and operatively connected thereto so that displacement of the operating shaft causes a corresponding variation in the capacitance between said plates.

6. The apparatus of claim 5 further including an electrical circuit connected between said dome-shaped capacitor plate and said frusto-spherical capacitor plates for measuring the variation in capacity therebetween so that displacement of the operating shaft is converted into corresponding electrical signals.

* * * * *